United States Patent
Nagle et al.

(10) Patent No.: US 8,380,610 B1
(45) Date of Patent: Feb. 19, 2013

(54) SYSTEM AND METHOD FOR PROCESSING TRADING ORDERS

(75) Inventors: Robert T. Nagle, Little Falls, NJ (US); Daniel Abbatemarco, Colts Neck, NJ (US); Christopher Ferreri, Staten Island, NY (US); Richard Raymond May, Matthews, NC (US)

(73) Assignee: ICAP Services North America LLC, Jersey City, NJ (US)

( * ) Notice: Subject to any disclaimer, the term of this patent is extended or adjusted under 35 U.S.C. 154(b) by 64 days.

(21) Appl. No.: 12/509,937

(22) Filed: Jul. 27, 2009

Related U.S. Application Data

(63) Continuation of application No. 11/431,293, filed on May 9, 2006, now abandoned.

(51) Int. Cl.
*G06Q 40/00* (2012.01)
(52) U.S. Cl. .................. 705/37; 705/38; 705/44
(58) Field of Classification Search .............. 705/37, 705/15–45
See application file for complete search history.

(56) References Cited

U.S. PATENT DOCUMENTS

| | | | | |
|---|---|---|---|---|
| 7,058,602 | B1 * | 6/2006 | La Mura et al. ............. | 705/37 |
| 2002/0116317 | A1 * | 8/2002 | May ............................. | 705/37 |
| 2005/0055304 | A1 * | 3/2005 | Lutnick et al. ............... | 705/37 |
| 2005/0160032 | A1 * | 7/2005 | Lutnick et al. ............... | 705/37 |
| 2007/0239591 | A1 * | 10/2007 | May ............................. | 705/37 |

OTHER PUBLICATIONS

"Opportunity Knocks", Future Industry Magazine, Mary Ann Burns, Apr./May 2000, 7 pages.*

* cited by examiner

*Primary Examiner* — Hai Tran
(74) *Attorney, Agent, or Firm* — Dickstein Shapiro LLP

(57) ABSTRACT

A data processing system for implementing transaction management of auction-based trading is disclosed. The disclosed data processing system provides a structured trading protocol implemented through a sequence of trading paradigms. The system employs a distributed computer processing network linking together a matching engine and a plurality of workstations. The protocol and its programmed controlling logic enhances trading efficiency, rewards market makers, and fairly distributes market opportunity to system users. In some preferred embodiments, the structured trading protocol permits traders to enter hidden bids or offers during a clearing period that may be converted to transactable bids and offers when the clearing period terminates. In addition, in some preferred embodiments, the structured protocol permits traders to enter orders that specify an initial price and a better, hidden price. The system is programmed to improve the price of a trader's order within the cap established by the hidden price in particular circumstances in order to permit the trader to maintain priority in the order book when a better-priced order enters the market.

74 Claims, 18 Drawing Sheets

Fig. 6A

| Trader | Hidden Price | Shown Price | Quantity | Quantity | Shown Price | Hidden Price | Trader |
|---|---|---|---|---|---|---|---|
| A | 4 | 1 | 10 | | | | |
| | | | | | | | |
| | | | | | | | |

Fig. 6B

| Trader | Hidden Price | Shown Price | Quantity | Quantity | Shown Price | Hidden Price | Trader |
|---|---|---|---|---|---|---|---|
| A | 4 | 1 | 10 | 5 | 8 | 5 | B |
| | | | | | | | |
| | | | | | | | |

Fig. 6C

| Trader | Hidden Price | Shown Price | Quantity | Quantity | Shown Price | Hidden Price | Trader |
|---|---|---|---|---|---|---|---|
| A | 4 | 3 | 10 | 5 | 8 | 5 | B |
| C | | 3 | 5 | | | | |
| | | | | | | | |

Fig. 6D

| Trader | Hidden Price | Shown Price | Quantity | Quantity | Shown Price | Hidden Price | Trader |
|---|---|---|---|---|---|---|---|
| A | 4 | 3 | 10 | 5 | 6 | 5 | B |
| C | | 3 | 5 | 15 | 6 | 5 | D |
| | | | | | | | |

Fig. 6E

| Trader | Hidden Price | Shown Price | Quantity | Quantity | Shown Price | Hidden Price | Trader |
|---|---|---|---|---|---|---|---|
| A | 4 | 4 | 10 | 5 | 6 | 5 | B |
| E |   | 4 | 5 | 15 | 6 | 5 | D |
| C |   | 3 | 5 |   |   |   |   |

Fig. 6F

| Trader | Hidden Price | Shown Price | Quantity | Quantity | Shown Price | Hidden Price | Trader |
|---|---|---|---|---|---|---|---|
| A | 4 | 4 | 10 | 25 | 4 |   | F |
| E |   | 4 | 5 | 5 | 6 | 5 | B |
| C |   | 3 | 5 | 15 | 6 | 5 | D |

Fig. 6G

| Trader | Hidden Price | Shown Price | Quantity | Quantity | Shown Price | Hidden Price | Trader |
|---|---|---|---|---|---|---|---|
| C |   | 3 | 5 | 10 | 4 |   | F |
|   |   |   |   | 5 | 6 | 5 | B |
|   |   |   |   | 15 | 6 | 5 | D |

SYSTEM AND METHOD FOR PROCESSING TRADING ORDERS

CROSS REFERENCE TO RELATED APPLICATION

This is a continuation of application Ser. No. 11/431,293, filed May 9, 2006, which is hereby incorporated herein by reference.

BACKGROUND OF THE INVENTION

In many markets, buy and sell orders at the same price are automatically matched. Thus, for example, a first order to buy an item at a price of 100 and a second order to sell the same item at a price of 100 will, in such markets, result in a transaction in which some quantity of the item is sold at the specified price.

But in some markets, most notably the secondary market for U.S. government treasuries, orders of equal price are not automatically matched. Rather, certain types of buy and sell orders, called "passive" orders, may co-exist at the same price without triggering a transaction. These passive orders do not trade unless "aggressed" against by a trader submitting a second type of order, called an "aggressive" order. Historically, a passive order to buy has been referred to as a "bid," while a passive order to sell has been referred to as an "offer." By contrast, an aggressive order to sell has been referred to as a "hit," while an aggressive order to buy has been referred to as a "take" or "lift."

This distinction between passive and aggressive orders is one of several characteristics of the secondary market in U.S. government treasuries that developed to encourage market liquidity. In particular, since it is impossible to generate liquidity in a market without having someone first make a price, brokers historically sought to encourage traders to submit bids and offers by not charging them a commission if their orders resulted in a trade. Thus, passive bids and offers could not be matched even at the same price since neither the buyer nor the seller would pay commission.

In addition to commission-free trades, brokers in the secondary market for U.S. government treasuries also rewarded passive buyers and sellers by developing a number of trading protocols or conventions which granted passive buyers and sellers certain trading options or "rights." One such convention is commonly referred to as "workup." In general terms, this convention permits buyers and sellers to "work up" the size of a trade from the quantity traded as a result of an initial "hit" or "lift." Typically, certain traders, including the first aggressive-side and passive-side traders, are granted an option or right to increase their size, and to trade that additional size ahead of other traders in the queue.

Another popular convention in the secondary market for U.S. government securities is commonly referred to as "clearing time." In the clearing time convention, when a passive bid or offer is received in the market that is better in terms of price than the best existing passive order on that side of the market, the trader with the best pending passive order on the opposite side of the market is given priority to aggress against the new order before other traders. If this trader chooses not to aggress against the new passive order within a period of time, other traders with pending passive orders may be given that privilege in certain circumstances depending on the particular version of the clearing time convention implemented. If no trader with clearing time privileges aggresses against the new price-improving order, the new order "clears" and can be hit or lifted by any trader.

Before the advent of electronic trading, voice brokers implemented the clearing time convention by calling those traders with pending passive orders when the brokers received a new, price-improving passive order on the opposite side of the market, and asking them whether they wished to aggress against the new passive order. This practice was colloquially referred to as "clearing to the offer" in the case of a new, price-improving bid, and "clearing to the bid" in the case of a new, price-improving offer. Only after those traders with clearing privileges failed to respond or declined to aggress against the new passive order were other participants permitted to hit or take the new bid or offer.

As electronic trading has become more popular, some electronic platforms have been programmed to provide automated versions of the clearing time convention. In these electronic implementations, the convention is typically implemented by designating the order as "uncleared" and starting a clearing timer for a specified period of time. During the timer's duration, only the aggressive orders of traders with clearing privileges will be executed. Once the timer expires, the order "clears" and may be traded by anyone.

In another aspect of the clearing time convention, when a trader without the current right to aggress against an uncleared bid or offer submits a "hit" or "take" order, this action preserves for the trader the right to do the trade once the bid or offer clears. This has historically been referred to as "hit when" in the case of an aggressive order to sell submitted by a seller without priority, and as a "take when" in the case of an aggressive order to buy a security submitted by a trader without priority. But although the clearing time protocol provides a mechanism by which traders without priority may enter aggressive orders, it does not provide a mechanism by which traders without priority may enter passive orders at prices better than that established by an uncleared bid or offer. Rather, during the clearing time period, other traders wishing to submit such passive bids or offers are blocked from doing so.

BRIEF SUMMARY OF THE INVENTION

A data processing system for implementing transaction management of auction-based trading is disclosed. The disclosed data processing system provides a structured trading protocol implemented through a sequence of trading paradigms. The system employs a distributed computer processing network linking together a matching engine and a plurality of workstations. The protocol and its programmed controlling logic enhances trading efficiency, rewards market makers, and fairly distributes market opportunity to system users.

In some preferred embodiments, the structured trading protocol permits traders to enter hidden bids or offers during a clearing period that may be converted to transactable bids and offers when the clearing period terminates. In addition, in some preferred embodiments, the structured protocol permits traders to enter orders that specify an initial price and a better, hidden price. The system is programmed to improve the price of a trader's order within the cap established by the hidden price in particular circumstances in order to permit the trader to maintain priority in the order book when a better-priced order enters the market.

BRIEF DESCRIPTION OF THE SEVERAL VIEWS OF THE DRAWINGS

FIGS. 6A-G depict an illustrative example of system operation in the preferred embodiment of FIG. 5.

DETAILED DESCRIPTION OF THE INVENTION

Figure 1:
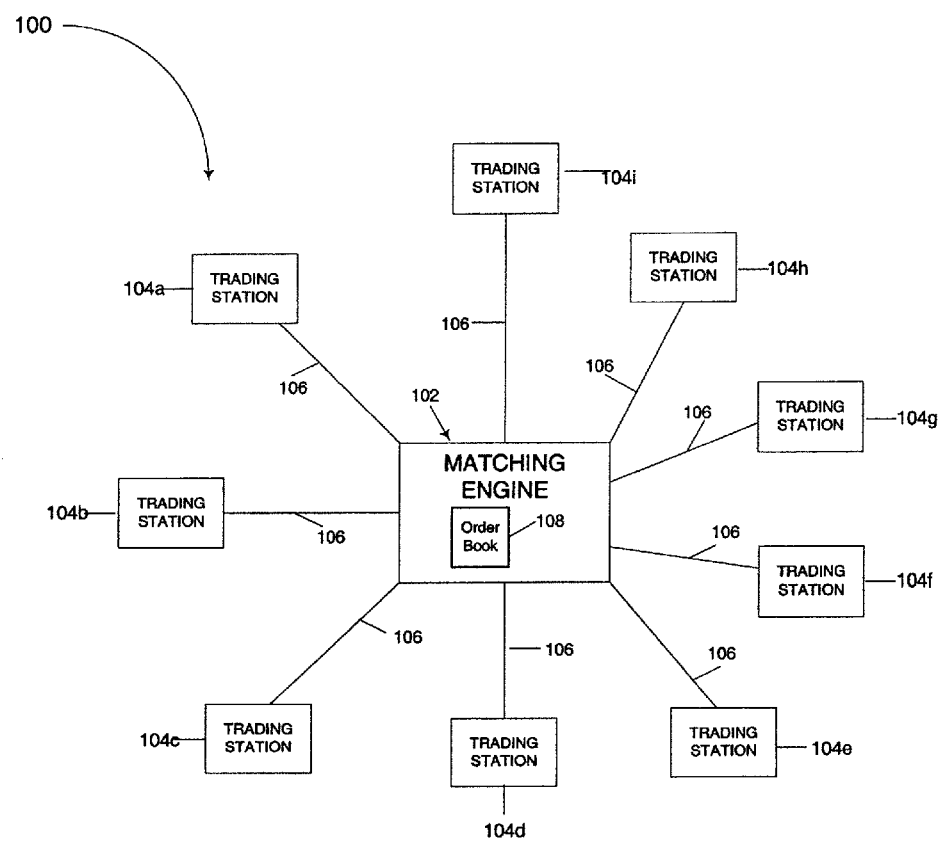
FIG. 1 is a block diagram depicting aspects of a preferred embodiment of the present system.
Figure 2A:
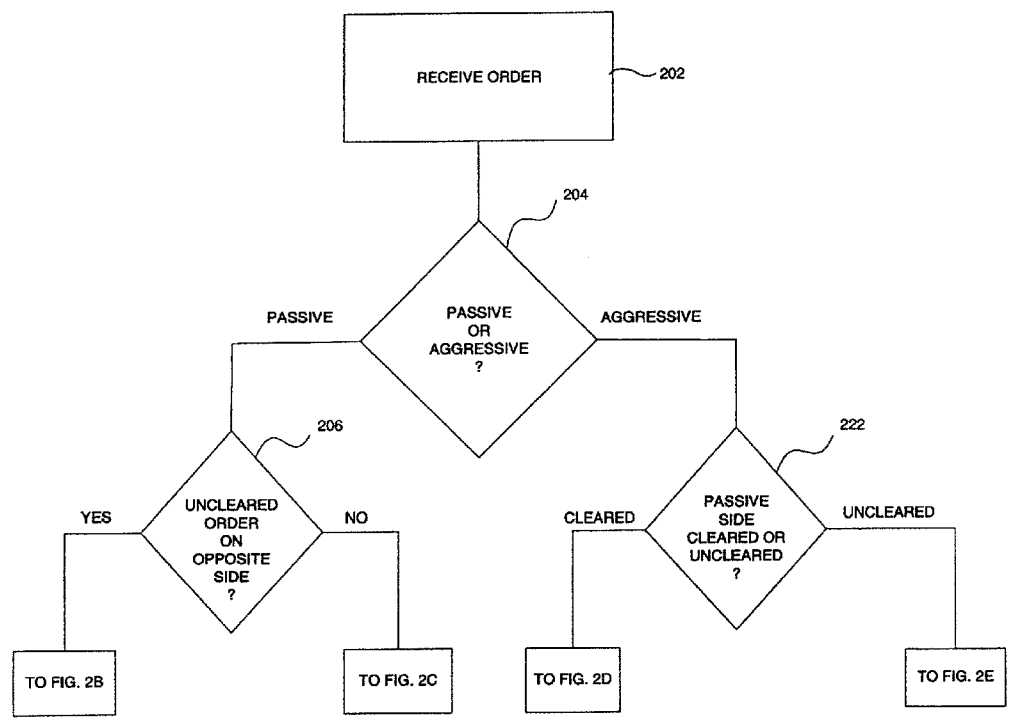
FIGS. 2A-E are flow diagrams illustrating aspects of system operation in processing a received order in a preferred embodiment.
Figure 2B:
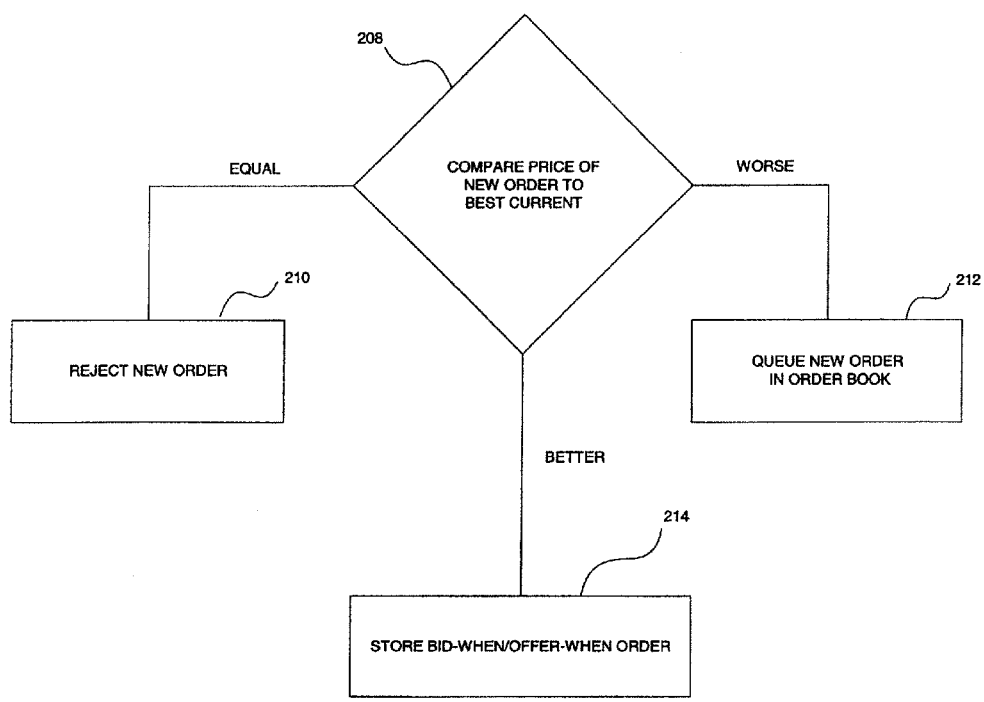
Figure 2C:
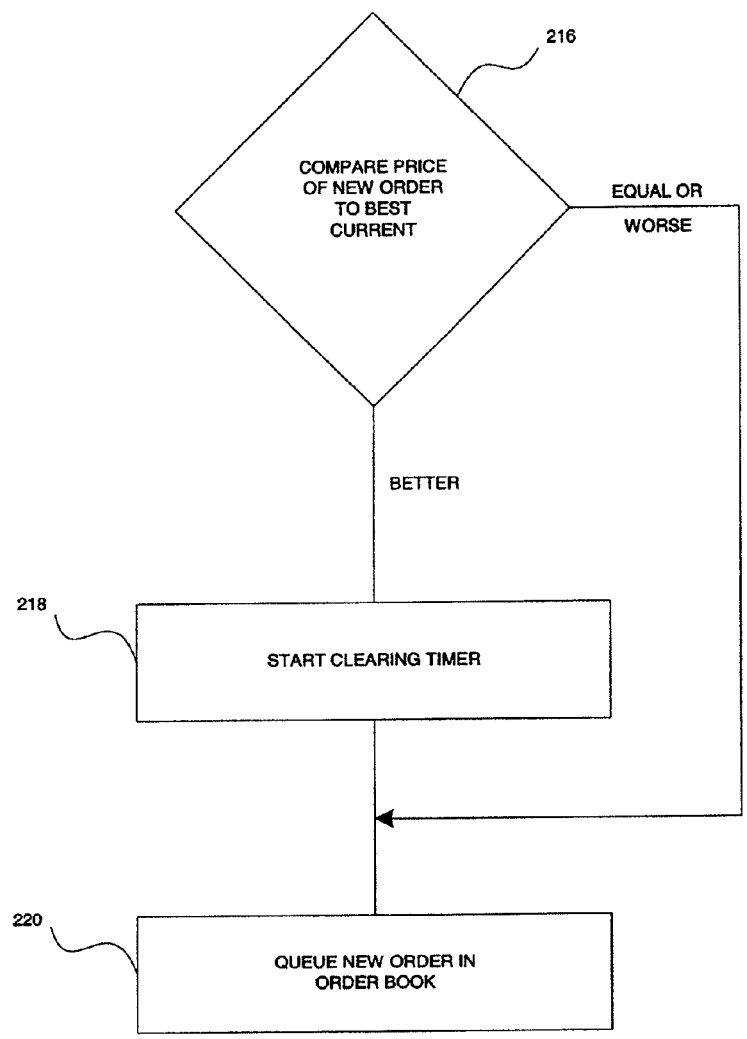
Figure 2D:
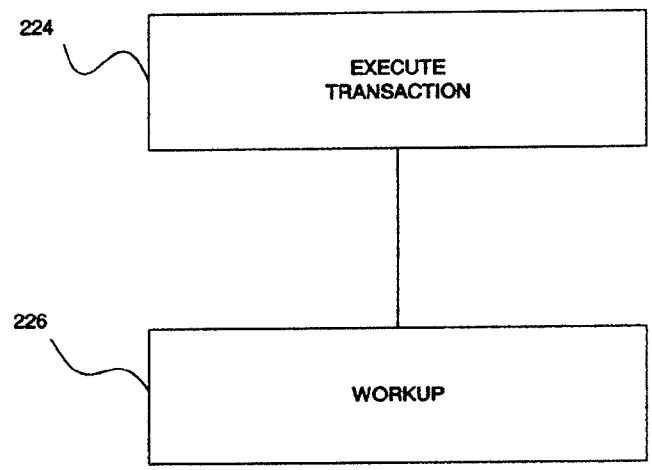
Figure 2E:
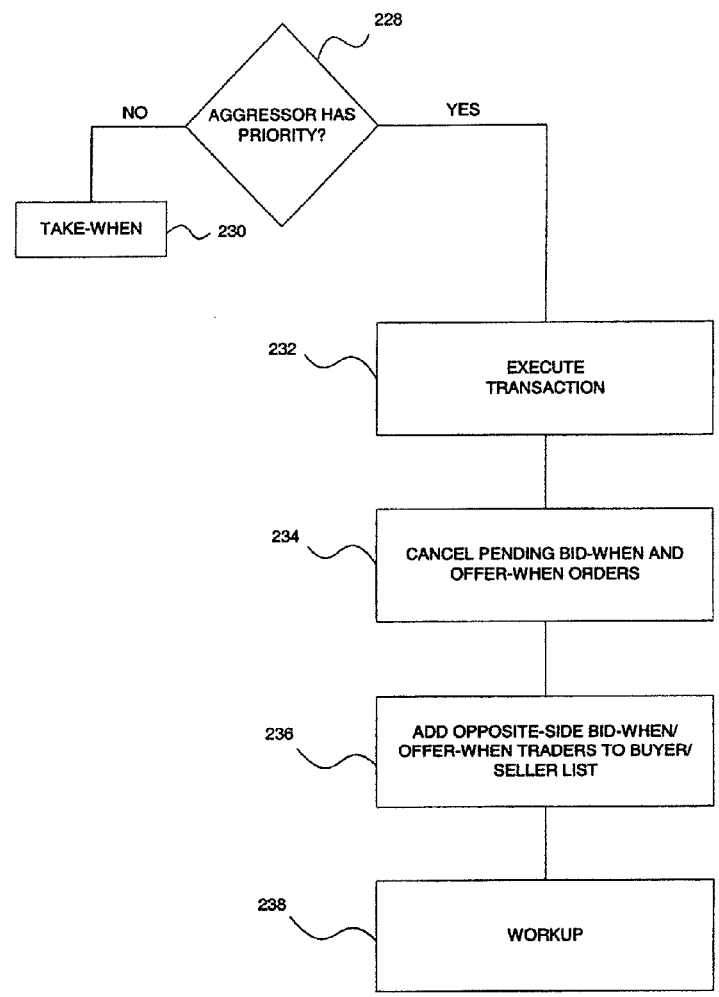
Figure 3A:
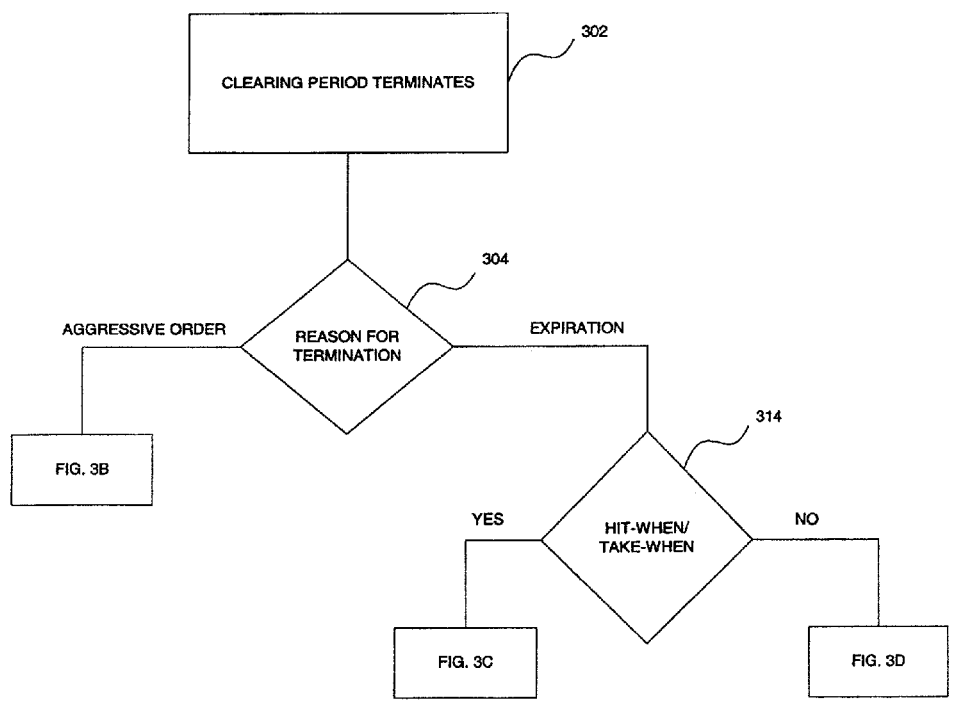
FIGS. 3A-D are flow diagrams illustrating aspects of system operation in processing termination of a clearing period in one preferred embodiment.
Figure 3B:
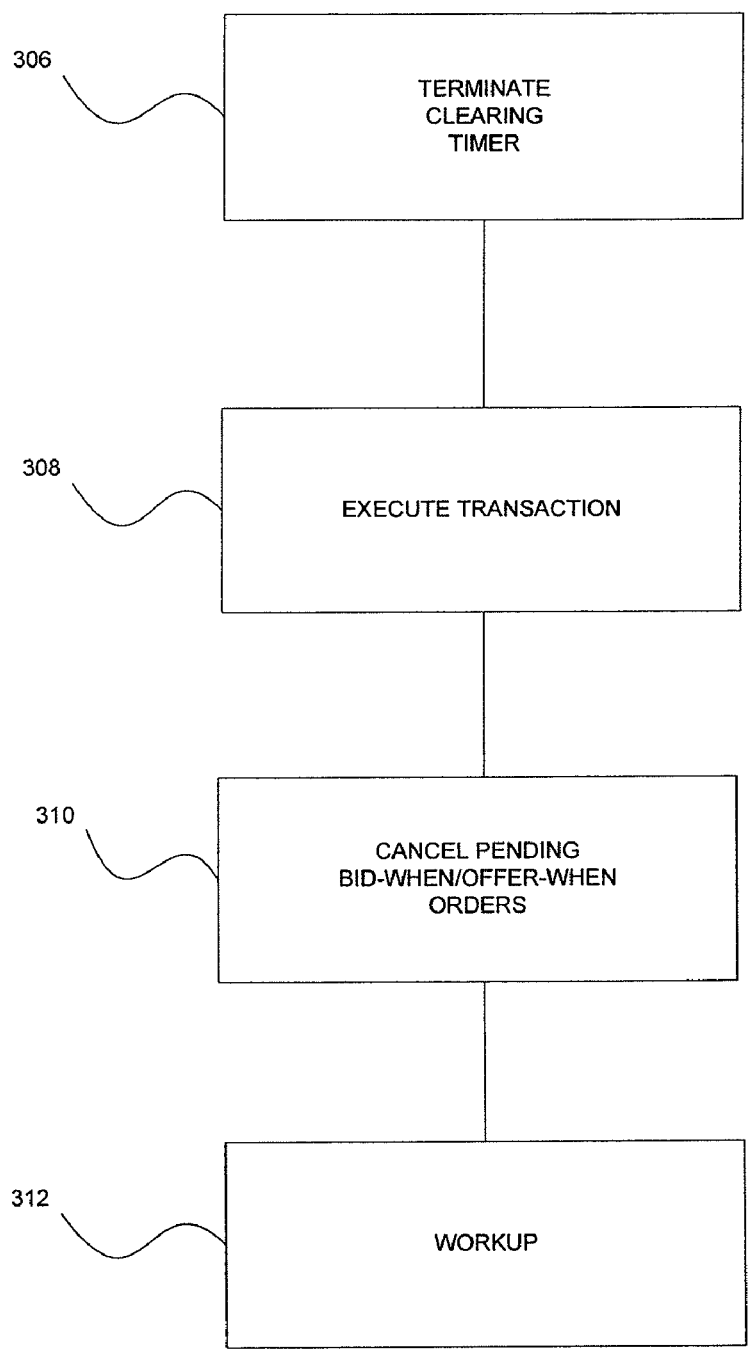
Figure 3C:
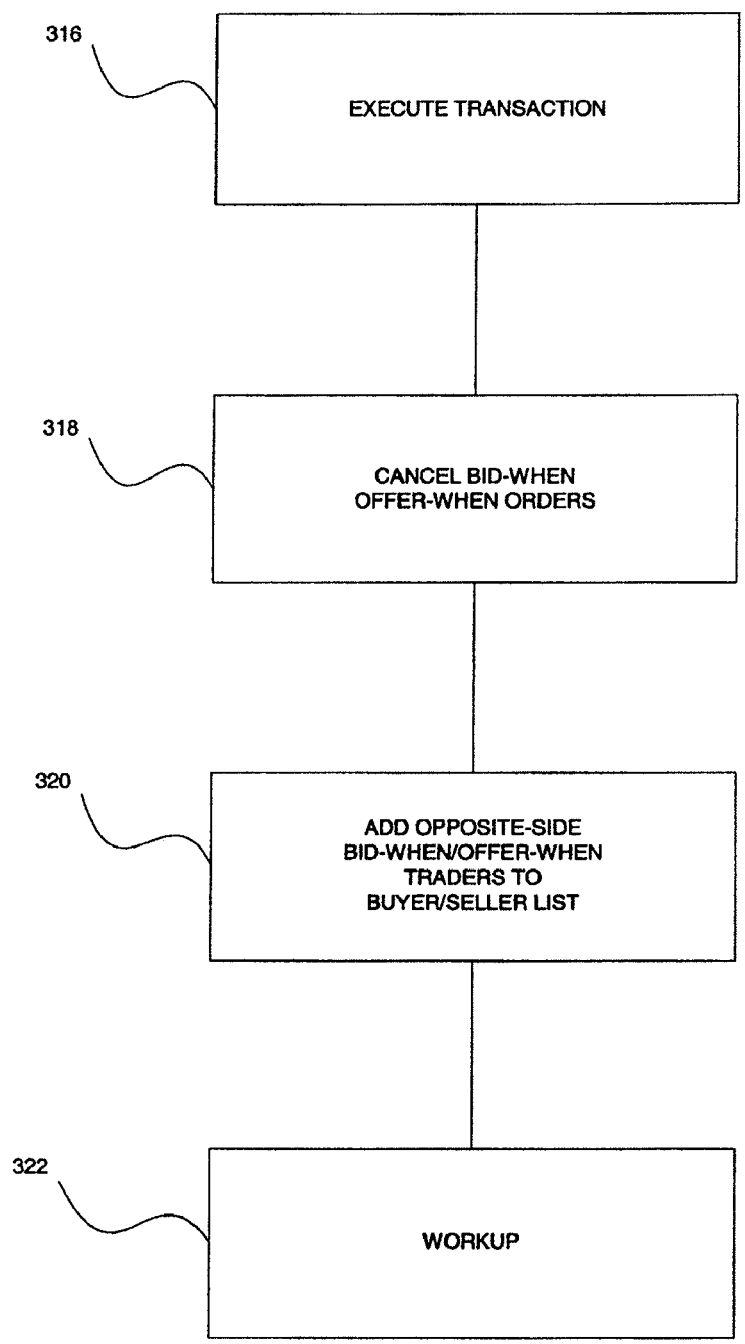
Figure 3D:
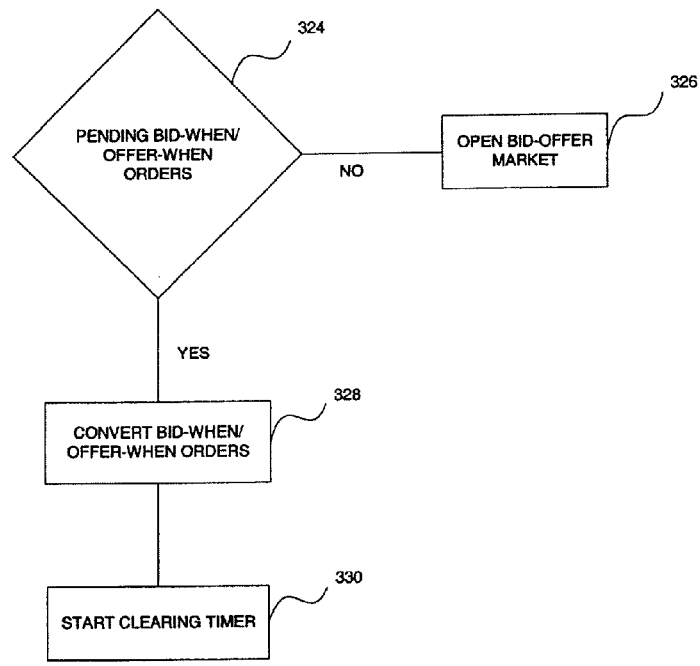
Figure 4A:
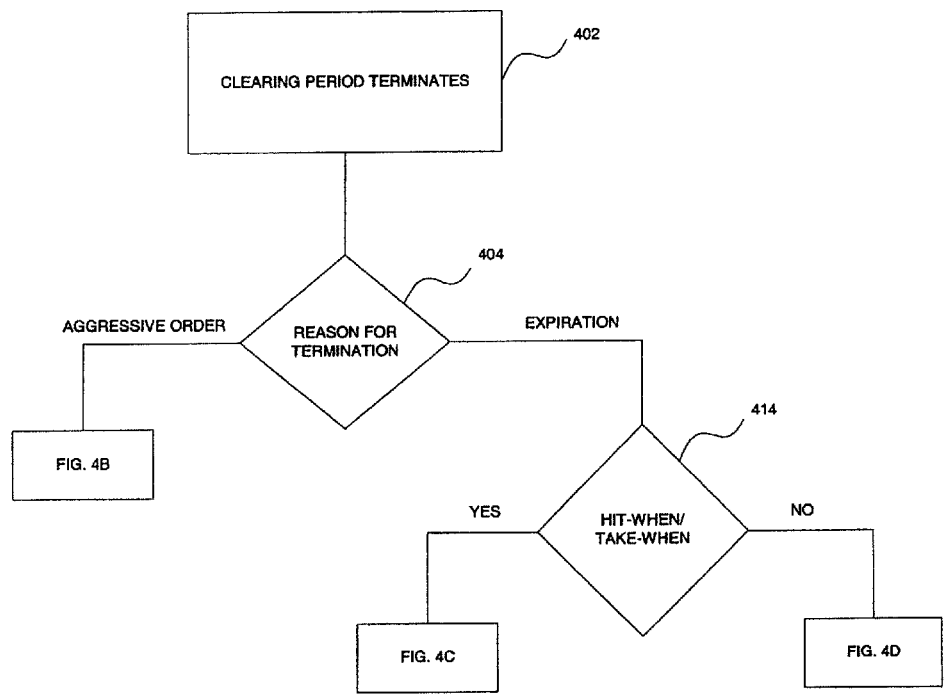
FIGS. 4A-D are flow diagrams illustrating aspects of system operation in processing termination of a clearing period in another preferred embodiment.
Figure 4B:
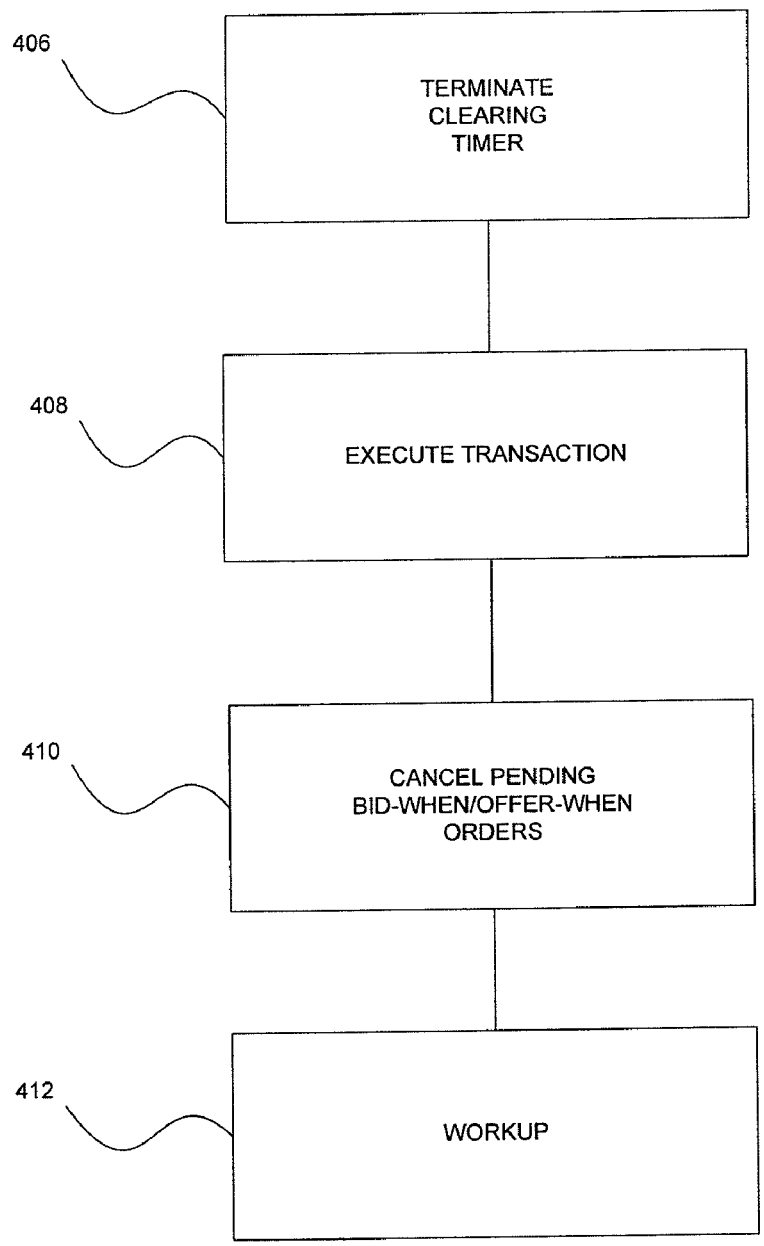
Figure 4C:
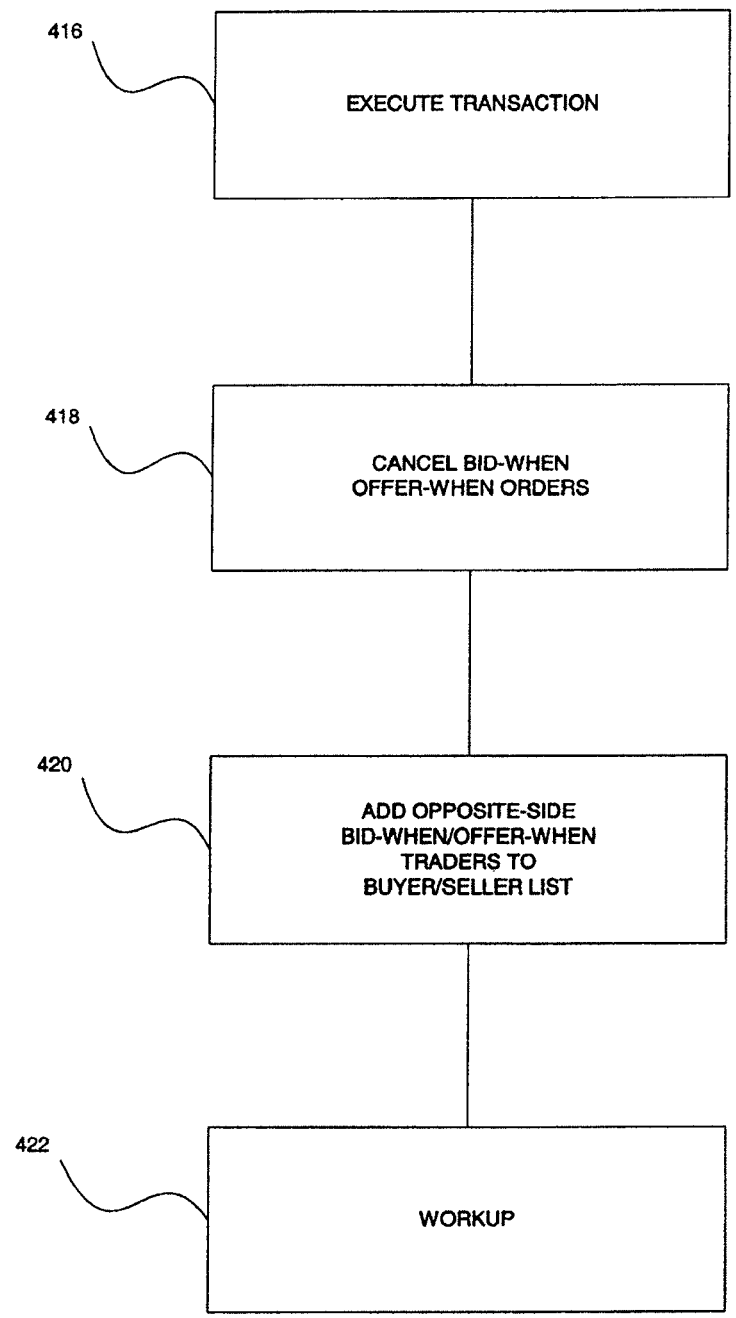
Figure 4D:
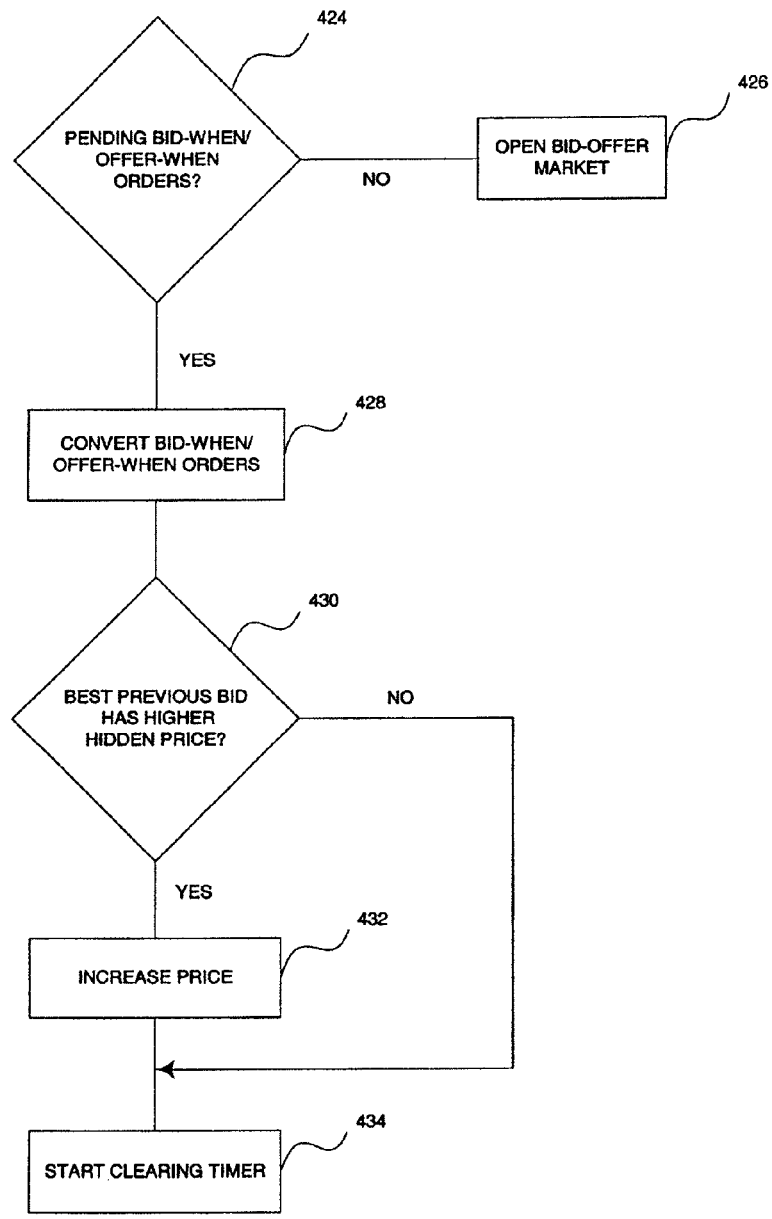

With reference to FIG. 1, there is shown a system 100 comprising a matching engine 102 and a plurality of customer terminals 104 connected via appropriate communication links 106. Matching engine 102 is preferably adapted to receive orders to buy and sell securities from terminals 104, to process trading orders in accordance with specified protocols, and to communicate market information concerning trading activity to terminals 104, as described in more detail below.

Matching engine 102 preferably comprises one or more server computers and associated components programmed to implement the trading activity described below. As further shown in FIG. 1, matching engine 102 preferably maintains an order book 108 that stores orders received by matching engine 102 from terminals 104, as described in more detail below.

Each terminal 104 may preferably be a computer workstation comprising a CPU, memory, a display, and input devices, such as a mouse, keyboard, or specialized trading keypad. Terminals 104 may be provided to customers for direct entry of buy and sell orders on their own behalf, or to brokers for entry of such orders on behalf of others. Communication links 106 may comprise any appropriate arrangement of wired or wireless communication lines or networks, such as the Internet or dedicated communication lines.

One preferred embodiment for processing trade orders in accordance with the present invention will now be described in connection with FIGS. 2A-E. For ease of description, it will be assumed in the following discussion that the received order is a buy order unless otherwise indicated. It will be recognized, however, that the principles described below may be equally applied where the received order is a sell order.

Turning to FIGS. 2A-E, at step 202, matching engine 102 receives an order to buy securities from a customer or broker entered via a terminal 104. At step 204, matching engine 102 determines whether the order is a passive order (i.e., a bid) or an aggressive order (i.e., a take). If the order is a bid (step 204, Passive), processing proceeds to step 206 where matching engine 102 determines whether there exists an uncleared offer on the opposite (i.e., sell) side of the market.

If there is an uncleared offer (step 206, Yes), matching engine 102 determines whether the new passive order is at a price that is equal to, better than, or worse than the current best bid (step 208). If the price of the new order is equal to the current best price (step 208, Equal), the new passive order is preferably rejected since passive orders at the best price are typically entitled to clearing privileges vis a vis uncleared passive orders on the other side of the market, and a trader should not be able to obtain such privileges once an uncleared order is displayed to the market (step 210). Notably, however, in systems where only the first passive order in the queue is entitled to clearing privileges, subsequent passive orders submitted during a clearing period need not be rejected and may instead be queued on a price-time priority basis. Furthermore, in a system where more than one passive trader in the queue is or may be granted clearing privileges, the system may be programmed to store the new passive order in the order book but not to grant clearing privileges to the trader that submitted it. In addition, where the system operator is not concerned with granting clearing privileges to the new passive bidder or offeror, the new passive bidder or offeror may be permitted to join the order with clearing privileges. For the avoidance of doubt, to queue orders on a price-time priority basis in the context of the present system and method means to queue received orders first on the basis of their price, and then, in the case of tie in price, on the basis of time received.

If the price of the new passive order is below the best price in the market (step 208, Worse), the new order is queued in order book 108 on a price-time priority basis (step 212). Alternatively, where the market is one for which no market depth is maintained, orders submitted at worse than the current best price may be rejected.

Otherwise, if the new passive order is above the best price in the market (step 208, Better), the order is stored by matching engine 102 but preferably not entered in order book 108 and not displayed to the market (step 214). Passive orders processed according to step 214 will be referred to herein as "bid-when" orders (in the case of passive orders to buy) and "offer-when" orders (in the case of passive orders to sell).

In a preferred embodiment, bid-when and offer-when orders may be canceled by the traders that submitted them at any time during the clearing period. Where a plurality of bid-when or offer-when orders are entered, these are preferably stored based on price-time priority. A bid-when or offer-when indicator may be provided, but is preferably displayed only to the traders that have entered bid-when or offer-when orders. Additional aspects of the processing of bid-when and offer-when orders are described below in connection with other portions of FIGS. 2A-E and in connection with FIGS. 3A-D and FIG. 4.

Returning to decision step 206, if there is no uncleared order on the sell side of the market (step 206, No), matching engine 102 determines whether the new bid is at a better price than the best current bid in the market (Step 216). If so (step 216, Better), the new order is designated uncleared and a clearing timer is started (step 218). At step 220, the received order is entered in order book 108 on a price-time priority basis. As noted above, where the market is one for which no market depth is maintained, orders identified at step 216 as being at worse than the current best price may be rejected. In addition, where the market is one for which only one bid or offer may be submitted at a given price, orders identified at step 216 as being at the current best price may be rejected.

Returning next to decision step 204, if the received order is an aggressive order (step 204, Aggressive), matching engine 102 determines whether the order seeks to aggress against an uncleared offer (step 222). More specifically, in a preferred embodiment, matching engine 102 determines whether an unexpired clearing timer for the sell side of the market has been set and is running.

If the passive offer to be matched is cleared (step 222, Cleared), the aggressive order and the pending passive order are matched (step 224). Processing proceeds to step 226 where the trade may be worked up in accordance with any desired workup protocol implemented by the system.

Otherwise, if the order against which the aggressor seeks to aggress is uncleared (step 222, Uncleared), processing proceeds to step 228 where matching engine 102 determines whether the aggressor has priority to aggress against the uncleared order, i.e., whether the aggressor is the trader that submitted the best pending passive order on the opposite side of the market (or, in systems that grant clearing privileges to multiple passive parties, whether all passive traders with clearing privileges ahead of the aggressor have given up or otherwise lost those rights.

If the aggressor is not currently entitled to execute the transaction (step 228, No), a "take when" situation is created (step 230). As known in the art, in a "take when" situation, the aggressive take order is not executed but is instead held pending expiration of the clearing rights of all traders ahead of the aggressor. If none of those traders elect to aggress against the uncleared order and their clearing rights expire, then the pending aggressive take-when order will be executed, as discussed in more detail in connection with FIGS. 3 and 4 below.

Otherwise, if the aggressor is entitled to hit the pending uncleared bid (step 228, Yes), the transaction is executed at step 232. At step 234, all pending bid-when and offer-when orders are canceled. At step 236, if any of these canceled orders were on the opposite side of the market from the aggressor (i.e., if they were offer-when orders in the present example), matching engine 102 preferably adds the traders who submitted those orders to the list of buyers or sellers on the passive side of the market at the execution price based on the price-time priority of their bid-when or offer-when orders. For example, if the passive side of the market included two offers that were taken by the aggressor (ranked first and second on the basis of price-time priority), and there were also stored in the system two pending offer-when orders (ranked first and second on the basis of price-time priority), the system preferably establishes the list of sellers as: (1) the trader that submitted offer #1; (2) the trader that submitted offer #2; (3) the trader that submitted offer-when order #1; and (4) the trader that submitted offer-when order #2. Processing then proceeds to step 238 where the trade may be worked up in accordance with any desired workup protocol implemented by the system.

FIG. 3 is a flow diagram illustrating one preferred embodiment of system processing when a clearing period terminates. For ease of description, it will be assumed in the following discussion that the passive order clearing to the market is a sell-side order (i.e., an offer) unless otherwise indicated. It will be recognized, however, that the principles described below may be equally applied to cases where the passive order clearing to the market is a bid.

Turning to FIG. 3, at step 302, a clearing period terminates. At step 304, the system determines whether the clearing period terminated because of: (a) expiration of a clearing timer without trading activity, or (b) as a result of an aggressive order from the uncleared side of the market, i.e., a hit in this example. If the clearing period terminated because of an aggressive order from the uncleared side of the market (step 304, Aggressive Order), the system terminates the clearing timer (step 306), executes the aggressive order (step 308), and cancels any pending bid-when orders (step 310). Processing proceeds to step 312 where the trade may be worked up in accordance with any desired workup protocol implemented by the system.

Otherwise, if the clearing period terminated because of expiration of a clearing timer without trading activity (step 304, Expiration), the system determines whether a take-when order is waiting to be executed (step 314). In a preferred embodiment, this branch of system processing is also followed where the clearing period terminates for other reasons such as where the trader with clearing privileges modifies his or her order but does not hit or take the uncleared order as to which he or she has priority, cancels his or her order, or expressly clears the uncleared order as to which he or she has priority.

If a take-when order is waiting to be executed (step 314, Yes), the take-when order is executed and a transaction occurs (step 316). At step 318, all pending bid-when and offer-when orders are cancelled. At step 320, if any of these canceled orders were on the opposite side of the market from the aggressor, matching engine 102 preferably adds the traders who submitted those orders to the list of buyers or sellers on the passive side of the market based on the time-price priority of their bid-when or offer-when orders, in the manner described above. Processing proceeds to step 322 where the trade may be worked up in accordance with any desired workup protocol implemented by the system.

Otherwise, if there are no waiting take-when orders to be executed (step 314, No), the system determines whether there are any pending bid-when orders that had been stored during the clearing period (step 324). If there are no pending bid-when orders (step 324, No), the offer clears and an open bid-offer market results in which any trader may aggress against the newly-cleared offer (step 326).

Otherwise, if there are pending bid-when orders (step 324, Yes), the bid-when orders are converted to bids at their specified prices and queued in order book 108 based on their price-time priority (step 328). As will be recognized, in the preferred embodiment of the present invention, the best pending price at this stage of system processing will always represent an improvement over the best previously pending price on the same side of the market, either because (1) the trader with clearing privileges improved the price of his or her order to a price that is better than the prices of all bid-when orders, in which case that trader remains the best bid, but at a higher price that should be cleared to the opposite side of the market; or (2) the trader with clearing privileges did not improve the price of his or her order to a price that is better than the prices of all bid-when orders, in which case the new highest priority bid in the market will be the converted bid-when order with the highest price-time priority and should be cleared to the opposite side of the market. Thus, in scenario (1) above, the original best bid's new higher-priced order is preferably designated as uncleared while in scenario (2) above, the converted bid-when order with the highest price-time priority is e preferably designated as uncleared, and, in both scenarios, a new clearing timer is commenced to clear the new uncleared bid to the recently cleared offer on the opposite side of the market (step 330). In a preferred embodiment, if conversion of a bid-when or offer-when order to a bid or offer would create a reverse market, the bid-when or offer-when order is cancelled and not converted.

The preferred embodiment of FIGS. 2 and 3 will now be further described by way of two illustrative examples.

EXAMPLE 1

1. A bids @ 4
2. B offers @ 7
3. C bids-when @ 6
4. D bids-when @ 5
5. E takes-when B's 7 offer
6. the clearing timer expires Upon expiration of the clearing timer, Trader E's take-when order will execute, and the two bid-when orders of Trader C and Trader D are canceled.

EXAMPLE 2

1. A bids @ 4
2. B offers @ 7

3. C bids-when @ 5
4. D bids-when @ 6
5. E hits A's 4 bid

In this example, Trader E's hit is executed and the two bid-when orders of Trader C and Trader D are canceled. Trader D is designated second buyer and Trader C is designated third buyer. As noted above, because Trader D's bid-when order was at a better price than that of Trader C, Trader D becomes the second buyer behind Trader A. Had both Trader D and Trader C bid-when at the same price, time priority would have controlled their order in the buyer queue.

FIG. 4 is a flow diagram illustrating another preferred embodiment of system processing when a clearing period terminates. This preferred embodiment is designed to provide the current best bid/best offer with protection against being replaced as the best price in the market as a result of a bid-when/offer-when order. Specifically, in this preferred embodiment, a trader entering a passive order may specify a first price at which the trader wishes the order to be displayed in the first instance, and a higher hidden price, at which the trader wishes the order to be displayed if the original price is bettered in the market. As above, it will be assumed in the following discussion that the passive order clearing to the market is a sell-side order (i.e., an offer) unless otherwise indicated. It will be recognized, however, that the principles described below may be equally applied to cases where the passive order clearing to the market is a bid.

Turning to FIG. 4, at step 402, a clearing period terminates. At step 404, the system determines whether the clearing period terminated because of: (a) expiration of a clearing timer without trading activity, or (b) as a result of an aggressive order from the uncleared side of the market (i.e., a hit in this example). If the clearing period terminated because of an aggressive order from the uncleared side of the market (step 404, Aggressive Order), the system terminates the clearing timer (step 406), executes the aggressive order (step 408), and cancels any pending bid-when orders (step 410). Processing proceeds to step 412 where the trade may be worked up in accordance with any desired workup protocol implemented by the system.

Otherwise, if the clearing period terminated because of expiration of a clearing timer without trading activity (step 404, Expiration), the system determines whether a take-when order is waiting to be executed (step 414). In a preferred embodiment, this branch of system processing is also followed where the clearing period terminates for other reasons such as where the trader with clearing privileges modifies his or her order but does not hit or take the uncleared order as to which he or she has priority, cancels his or her order, or expressly clears the uncleared order as to which he or she has priority.

If a take-when order is waiting to be executed (step 414, Yes), the take-when order is executed and a transaction occurs (step 416). At step 418 all pending bid-when and offer-when orders are cancelled. At step 420, if any of these cancelled were on the opposite side of the market from the aggressor, matching engine 102 preferably adds the traders who submitted those orders to the list of buyers or sellers on the passive side of the market based on the time-price priority of their bid-when or offer-when orders, in the manner described above. Processing proceeds to step 422 where the trade may be worked up in accordance with any desired workup protocol implemented by the system.

Otherwise, if there are no waiting take-when orders to be executed (step 414, No), the system determines whether there are any pending bid-when orders that had been stored during the clearing period (step 424). If there are no pending bid-when orders (step 424, No), the offer clears and an open bid-offer market results in which any trader may aggress against the newly-cleared offer (step 426).

Otherwise, if there are pending bid-when orders (step 424, Yes), the bid-when orders are converted to bids at their specified prices and queued in order book 108 based on their price-time priority (step 428). At step 430, matching engine 102 determines whether the previous best bid in the market had specified a hidden price for its order higher than the price that was displayed to the market. If so (step 430, Yes), matching engine 102 increases the price of that bid (step 432). In one preferred embodiment, the price of the bid may be increased to the lower of: (a) the highest hidden price specified by the trader; or (b) the new best price specified in a bid-when order. In a second preferred embodiment, the price of the trader's bid may be increased to the lower of: (a) the highest hidden price specified by the trader; or (b) the new best price specified in a bid-when order plus some increment. In some preferred embodiments, the price of the trader's bid may be increased only if the bid's specified hidden price is high enough such that it can return the trader's bid to first in the market.

As will be recognized, in the preferred embodiment of the present invention, the new best price in the market (whether that of the trader that submitted a converted bid-when order or the original high bidder whose hidden price returned its original bid to the top of the queue) will always represent an improvement over the best pending price on the same side of the market. Thus, the new highest priority bid is preferably designated as uncleared, and a new clearing timer is commenced to clear this bid to the recently cleared offer on the opposite side of the market (step 434).

The preferred embodiment of FIGS. 2 and 4 will now be further described in connection with an illustrative example:

EXAMPLE 1

1. A bids @ 4, hidden price of 7
2. B offers @ 8
3. C bids-when @ 6
4. D bids-when @ 5
5. the clearing timer expires Upon expiration of the clearing timer, the two bid-when orders of Trader C and Trader D are converted to regular bids at prices of 6 and 5, respectively. However, because Trader A bid with a maximum hidden price of 7, his bid will be re-priced to outbid that of Trader C and will be placed at the head of the queue, either at a price of 6 or at a price some specified increment above 6, depending on the preferred embodiment selected.

In a preferred embodiment, bid-when orders and offer-when orders may also be permitted to specify a hidden price. As will be recognized, in such a preferred embodiment, a "bidding war" may transpire when a bid-when or offer-when order is first converted to a regular bid or offer, and it may take several iterations of price increases to reach a new market steady state.

In other preferred embodiments of the present invention, the concept of hidden prices may be applied more generally in any two-sided market, whether or not the market implements a clearing time convention and whether or not the market distinguishes between passive and aggressive orders. A preferred embodiment for implementing hidden-price functionality in a First-In-First-Out (FIFO) market in which no clearing time or workup convention is employed, and in which all buy and sell orders are automatically matched if their prices are the same, will now be described in connection with FIG.

5. For ease of description, it will be assumed in the following discussion that the new order received for processing is a buy order. It will be recognized, however, that the principles described below may be equally applied to cases where the new order received for processing is a sell order.

Figure 5A:
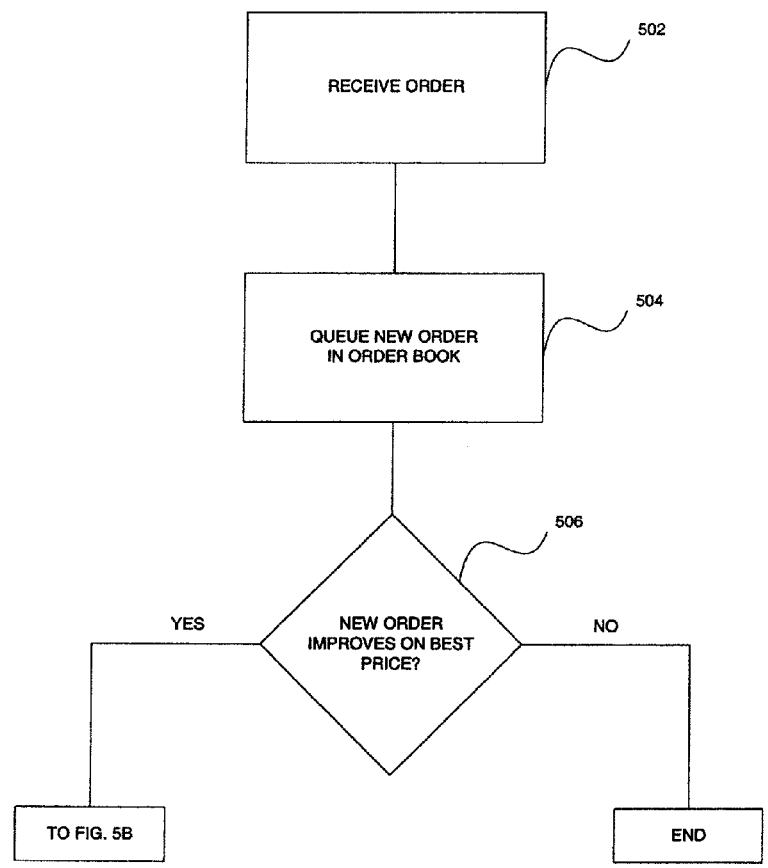
FIGS. 5A-B is a flow diagram illustrating aspects of system operation in processing orders specifying hidden prices in a preferred embodiment.
Figure 5B:
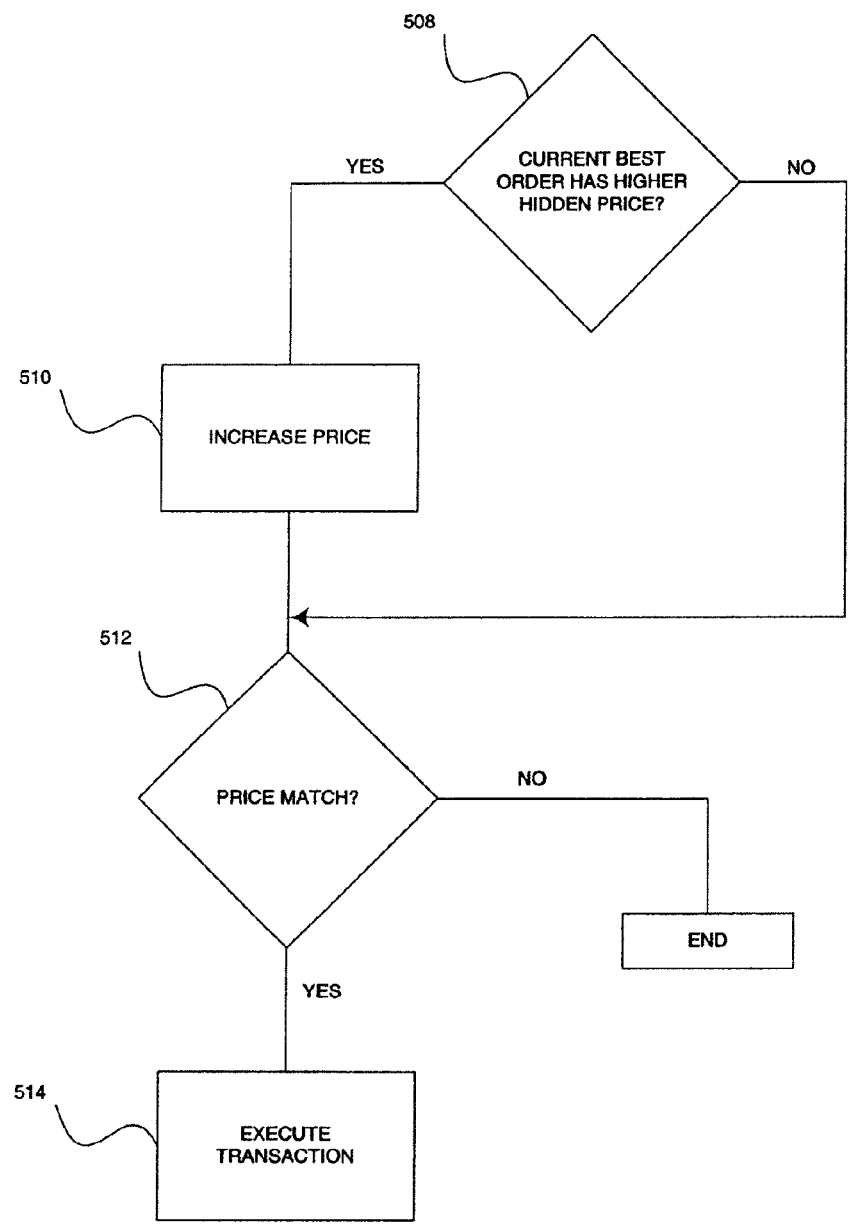

Turning to FIG. 5, in step 502, a new buy order is received by matching engine 102 entered by a trader or broker via a terminal 104. In step 504, the new buy order is queued on a price-time priority basis in order book 108. At step 506, matching engine 102 determines whether the new order improves on the best buy price in order book 108: If it does (step 506, Yes), matching engine 102 determines whether the previously best-priced buy order in order book 108 specifies a hidden price greater than the price shown to the market (step 508). If it does (step 508, Yes), matching engine 102 will attempt to increase the price of the previously best-priced order to return it to first in the buy-side order queue (step 510). As above, matching engine 102 may be programmed to increase the price of the previously best-priced buy order (assuming the hidden-size cap permits) to: (a) equal the price of the new buy order; or (b) greater than the price of the new buy order by a specified amount. Furthermore, matching engine 102 may be programmed to increase the size of the previously best-priced order only if that increase will be adequate to return the order to first place in the buy-side order queue.

At step 512, matching engine 102 determines whether the improved price (whether resulting from the newly submitted order, an hidden-price improvement in the previously best-priced order, or both) causes a match with a pending order on the opposite side of the market. If so (step 512, Yes), orders at the same price are matched to the extent their quantities match (step 514).

As will be recognized, because the trading logic of FIG. 5 is preferably applied on both the buy and sell side of the market, a "bidding war" on both sides of the market may simultaneously occur resulting in a more rapid convergence of the market to a price at which both buyers and sellers are willing to transact or to a significantly smaller spread than might otherwise occur, thus promoting market liquidity.

Operation of this preferred embodiment will now be described in connection with an illustrative example shown in FIGS. 6A-G. Beginning with FIG. 6A, it is assumed for purposes of the present example that a Trader "A" enters a buy order for a quantity of 10 at a price of 1 with a hidden price maximum of 4. In FIG. 6B, Trader "B" enters a sell order for a quantity of 5 at a price of 8 with a hidden price minimum of 5. For purposes of the present example, it is assumed that the market for this item is a FIFO market and no clearing of the new sell order to the existing buy order is necessary, i.e., the new sell order is immediately transactable by any trader.

Continuing with the example, in FIG. 6C, Trader "C" enters a buy order for a quantity of 5 at a price of 3, but with no hidden price specified. As a result, the price of Trader A's order is increased to a price of 3 to match that of Trader C (since that is within the hidden price maximum of 4 specified for the order by Trader A), and the two orders are maintained in the order book with Trader A's order maintaining priority. As will be recognized, the present example implements the preferred embodiment described above in which the price of Trader A's order is increased only to match that of Trader C, not beyond it.

In FIG. 6D, Trader "D" enters a sell order for a quantity of 15 at a price of 6 with a hidden price of 5. As a result, the price of Trader B's order is decreased to 6 (since that is within the hidden price minimum of 5 specified for the order by Trader B), and the two orders are maintained in the order book with Trader B's order maintaining priority.

In FIG. 6E, Trader "E" enters a buy order for a quantity of 5 at a price of 4 with no hidden price specified. As a result, the price of Trader A's order is increased to a price of 4 to match that of Trader E (since that is within the hidden price maximum of 4 specified for the order by Trader A), and the two orders are maintained in the order book with Trader A's order maintaining priority. Trader C's order is also maintained in the order book, but at a lower priority on the basis of its lower price.

In FIG. 6F, Trader "F" enters a sell order for a quantity of 25 at a price of 4 with no hidden price. This price matches the orders of Trader A and Trader E and thus triggers a transaction for Trader A's quantity of 10 and Trader E's quantity of 5. As will be recognized, the present example implements the preferred embodiment described above in which the prices of Trader B's and Trader D's orders are not decreased from 6 to 5 despite Trader F's order at a price of 4, since improving the price of those orders would not return either B or D to first position in the queue.

As shown in FIG. 6G, after execution of this transaction, the only order remaining on the buy side of the market is that of Trader C at a price of 3. On the sell side, Trader F has an order at 4 for his remaining quantity of 10, and Trader B's and Trader D's orders at 6 also remain in the order book.

While the present invention has been described in conjunction with specific embodiments, it is evident that numerous alternatives, modifications, and variations will be apparent to those skilled in the art in view of the foregoing description.

The invention claimed is:

1. A computerised method of trading an item, comprising:
   receiving from a first trader a first passive order to buy a security at a computerised matching engine;
   following receipt of the first passive order to buy, receiving from a second trader a passive order to sell the security;
   providing the first trader that submitted the first passive order to buy with an exclusive opportunity to aggress against the passive order to sell for a predetermined period;
   while the first trader that submitted the passive order to buy has said exclusive opportunity, receiving at the computerised matching engine from a trader a second passive order to buy the security at a price better than the price of the first passive order to buy the security;
   storing at the computerised matching engine the second passive order to buy as a non-transactable order which cannot be matched with an order to sell;
   upon termination of the exclusive opportunity after the predetermined period, converting, at the computerised matching engine, the stored second passive order to buy to a transactable passive order to buy which can be matched with an order to sell or cancelling the second passive order to buy.

2. The method of claim 1, wherein the second passive order to buy is converted to a transactable order at the better price.

3. The method of claim 1, wherein the second passive order to buy is converted to a transactable order if the exclusive opportunity terminated after the predetermined period as a result of expiration of a clearing timer and there is no take-when order waiting to be processed when the clearing timer expires.

4. The method of claim 1, wherein the second passive order to buy is cancelled if the exclusive opportunity terminated as a result of an aggressive order being executed.

5. The method of claim 4, wherein the trader that submitted the second passive order to buy is made second buyer behind the aggressor.

6. The method of claim 5, wherein the aggressor is the trader that submitted the first passive order to buy.

7. The method of claim 5, wherein the aggressor is a trader on the sell side of the market.

8. The method of claim 1, wherein the exclusive opportunity terminated as a result of expiration of a clearing timer and there is a take-when order waiting to be processed when the clearing timer expires.

9. The method of claim 8, wherein the trader that submitted the second passive order to buy is made second buyer behind the aggressor.

10. The method of claim 1, wherein the first passive order to buy specifies a hidden price for the order, which is not visible to market participants.

11. The method of claim 10, wherein, if the second passive order to buy is converted to a transactable order, the price of the first passive order to buy is increased within a cap established by the hidden price so that the first passive order to buy maintains priority in a bid queue.

12. The method of claim 11, wherein the price of the first passive order to buy is increased to an amount equal to the price of the converted second passive order to buy.

13. The method of claim 11, wherein the price of the first passive order to buy is increased to an amount equal to the price of the converted second passive order to buy plus an increment.

14. The method of claim 10, wherein the second passive order to buy also specifies a hidden price which is not visible to market participants.

15. The method of claim 14, wherein the priority of the first passive order to buy and the second passive order to buy in a bid queue is determined on the basis of which order has the higher hidden price.

16. A computerised method of trading an item, comprising:
receiving from a first trader a first passive order to sell a security;
following receipt of the first passive order to sell, receiving at a computerised matching engine from a second trader a passive order to buy the security;
providing the first trader that submitted the first passive order to sell with an exclusive opportunity to aggress against the passive order to buy for a predetermined period;
while the first trader that submitted the passive order to sell has said exclusive opportunity at the computerised matching engine, receiving from a trader a second passive order to sell the security at a price better than the price of the first passive order to sell the security;
storing the second passive order to sell as a non-transactable order which cannot be matched with an order to buy;
upon termination of the exclusive opportunity after the predetermined period, converting, at the computerised matching engine, the stored second passive order to sell to a transactable passive order to sell which can be matched with an order to buy or cancelling the second passive order to sell.

17. The method of claim 16, wherein the second passive order to sell is converted to a transactable order at the better price.

18. The method of claim 16, wherein the second passive order to sell is converted to a transactable order if the exclusive opportunity terminated after the predetermined period as a result of expiration of a clearing timer and there is no hit-when order waiting to be processed when the clearing timer expires.

19. The method of claim 16, wherein the second passive order to sell is cancelled if the exclusive opportunity terminated as a result of an aggressive order being executed.

20. The method of claim 19, wherein the trader that submitted the second passive order to sell is made second buyer behind the aggressor.

21. The method of claim 20, wherein the aggressor is the trader that submitted the first passive order to sell.

22. The method of claim 20, wherein the aggressor is a trader on the buy side of the market.

23. The method of claim 16, wherein the exclusive opportunity terminated as a result of expiration of a clearing timer and there is a hit-when order waiting to be processed when the clearing timer expires.

24. The method of claim 23, wherein the trader that submitted the second passive order to sell is made second seller behind the aggressor.

25. The method of claim 16, wherein the first passive order to sell specifies a hidden price for the order which is not visible to market participants.

26. The method of claim 25, wherein, if the second passive order to sell is converted to a transactable order, the price of the first passive order to sell is increased within a cap established by the hidden price so that the first passive order to sell maintains priority in an offer queue.

27. The method of claim 26, wherein the price of the first passive order to sell is increased to an amount equal to the price of the converted second passive order to sell.

28. The method of claim 26, wherein the price of the first passive order to sell is increased to an amount equal to the price of the converted second passive order to sell plus an increment.

29. The method of claim 25, wherein the second passive order to sell also specifies a hidden price, which is not visible to market participants.

30. The method of claim 29, wherein the priority of the first passive order to sell and the second passive order to sell in an offer queue is determined on the basis of which order has the higher hidden price.

31. A computerised method of trading an item, comprising:
receiving at a computerised matching engine from a first trader a first passive order to buy a security comprising a price and a hidden price which is not visible to other market participants;
receiving at the computerised matching engine from a second trader a first passive order to sell the security comprising a price and a hidden price which is not visible to other market participants;
receiving at the computerised matching engine from a trader a second order to buy the security comprising a price that is better than the price of the first passive order to buy the security but worse than the hidden price;
receiving at the computerised matching engine from a trader a second order to sell the security comprising a price that is better than the price of the first passive order to buy the security but worse than the hidden price;
at the computerised matching engine diminishing the market spread for the security by improving the price of both the first passive order to buy the security and the first passive order to sell the security so that both the first passive order to buy the security and the first passive order to sell the security remain at the head of respective bid and offer queues.

32. The method of claim 31, wherein the price of the first passive order to buy is increased to an amount equal to the price of the second passive order to buy.

33. The method of claim 31, wherein the price of the first passive order to buy is increased to an amount equal to the price of the second passive order to buy plus an increment.

34. The method of claim 31, wherein the second passive order to buy also specifies a hidden price which is not visible to market participants.

35. The method of claim 31, wherein the price of the first passive order to sell is increased to an amount equal to the price of the second passive order to sell.

36. The method of claim 31, wherein the price of the first passive order to sell is increased to an amount equal to the price of the second passive order to sell plus an increment.

37. The method of claim 31, wherein the second passive order to sell also specifies a hidden price which is not visible to market participants.

38. A computerised system for trading an item, comprising:
 a plurality of computer terminals for entering orders to buy or sell a security;
 a matching engine comprising one or more servers computers adapted to:
  receive from a first trader a first passive order to buy a security from a terminal of the plurality of terminals;
  following receipt of the first passive order to buy, receive from a second trader a passive order to sell the security from a terminal of the plurality of terminals;
  provide the first trader that submitted the first passive order to buy with an exclusive opportunity to aggress against the passive order to sell for a predetermined period;
  while the first trader that submitted the passive order to buy has said exclusive opportunity, receive from a trader a second passive order to buy the security from a terminal of the plurality of terminals at a better price than the price of the first passive order to buy the security;
  store the second passive order to buy as a non-transactable order which cannot be matched with an order to sell;
  upon termination of the exclusive opportunity after the predetermined period, convert the second passive order to buy to a transactable passive order to buy which can be matched with an order to sell or cancel the second passive order to buy.

39. The system of claim 38, wherein the second passive order to buy is converted to a transactable order at the better price.

40. The system of claim 38, wherein the second passive order to buy is converted to a transactable order if the exclusive opportunity terminated after the predetermined period as a result of expiration of a clearing timer and there is no take-when order waiting to be processed when the clearing timer expires.

41. The system of claim 38, wherein the second passive order to buy is cancelled if the exclusive opportunity terminated as a result of an aggressive order being executed.

42. The system of claim 41, wherein the trader that submitted the second passive order to buy is made second buyer behind the aggressor.

43. The system of claim 42, wherein the aggressor is the trader that submitted the first passive order to buy.

44. The system of claim 42, wherein the aggressor is a trader on the sell side of the market.

45. The system of claim 38, wherein the exclusive opportunity terminated as a result of expiration of a clearing timer and there is a take-when order waiting to be processed when the clearing timer expires.

46. The system of claim 45, wherein the trader that submitted the second passive order to buy is made second buyer behind the aggressor.

47. The system of claim 38, wherein the first passive order to buy specifies a hidden price for the order which is not visible to market participants.

48. The system of claim 47, wherein, if the second passive order to buy is converted to a transactable order, the price of the first passive order to buy is increased within a cap established by the hidden price so that the first passive order to buy maintains priority in a bid queue.

49. The system of claim 48, wherein the price of the first passive order to buy is increased to an amount equal to the price of the converted second passive order to buy.

50. The system of claim 48, wherein the price of the first passive order to buy is increased to an amount equal to the price of the converted second passive order to buy plus some increment.

51. The system of claim 47, wherein the second passive order to buy also specifies a hidden price which is not visible to market participants.

52. The system of claim 51, wherein the priority of the first passive order to buy and the second passive order to buy in a bid queue is determined on the basis of which order has the higher hidden price.

53. A computerised system for trading an item, comprising:
 a plurality of computer terminals for entering order to buy or sell a security;
 a matching engine comprising one or more server computers adapted to:
  receive from a first trader a first passive order to sell a security from a terminal of the plurality of terminals;
  following receipt of the first passive order to sell, receive from a second trader a passive order to buy the security from a terminal of the plurality of terminals;
  provide the first trader that submitted the first passive order to sell with an exclusive opportunity to aggress against the passive order to buy for a predetermined period;
  while the first trader that submitted the passive order to sell has said exclusive opportunity, receive from a trader a second passive order to sell the security from a terminal of the plurality of terminals at a price better than the price of the first passive order to sell the security;
  store the second passive order to sell as a non-transactable order which cannot be matched with an order to buy;
  upon termination of the exclusive opportunity after the predetermined period, convert the second passive order to sell to a transactable passive order to sell which can be matched with an order to buy or cancel the second passive order to sell.

54. The system of claim 53, wherein the second passive order to sell is converted to a transactable order at the better price.

55. The system of claim 53, wherein the second passive order to sell is converted to a transactable order if the exclusive opportunity terminated after the predetermined period as a result of expiration of a clearing timer and there is no hit-when order waiting to be processed when the clearing timer expires.

56. The system of claim 53, wherein the second passive order to sell is cancelled if the exclusive opportunity terminated as a result of an aggressive order being executed.

57. The system of claim 56, wherein the trader that submitted the second passive order to sell is made second buyer behind the aggressor.

58. The system of claim 57, wherein the aggressor is the trader that submitted the first passive order to sell.

59. The system of claim 57, wherein the aggressor is a trader on the buy side of the market.

60. The system of claim 53, wherein the exclusive opportunity terminated as a result of expiration of a clearing timer and there is a hit-when order waiting to be processed when the clearing timer expires.

61. The system of claim 60, wherein the trader that submitted the second passive order to sell is made second seller behind the aggressor.

62. The system of claim 53, wherein the first passive order to sell specifies a hidden price for the order which is not visible to market participants.

63. The system of claim 62, wherein if the second passive order to sell is converted to a transactable order, the price of the first passive order to sell is increased within a cap established by the hidden price so that the first passive order to sell maintains priority in an offer queue.

64. The system of claim 63, wherein the price of the first passive order to sell is increased to an amount equal to the price of the converted second passive order to sell.

65. The system of claim 63, wherein the price of the first passive order to sell is increased to an amount equal to the price of the converted second passive order to sell plus some increment.

66. The system of claim 62, wherein the second passive order to sell also specifies a hidden price which is not visible to market participants.

67. The system of claim 66, wherein the priority of the first passive order to sell and the second passive order to sell in an offer queue is determined on the basis of which order has the higher hidden price.

68. A computerised system for trading an item, comprising:
a plurality of computer terminals for entering orders to buy or sell a security;
a computerised matching engine comprising one or more servers computers adapted to:
receive from a first trader a first passive order to buy a security comprising a price and a hidden price from a terminal of the plurality of terminals wherein the hidden price is not visible to other market participants;
receive from a second trader a first passive order to sell the security comprising a price and a hidden price from a terminal of the plurality of terminals wherein the hidden price is not visible to other market participants;
receive from a trader a second order to buy the security comprising a price that is better than the price of the first passive order to buy the security but worse than the hidden price from a terminal of the plurality of terminals:
receive from a trader a second order to sell the security comprising a price that is better than the price of the first passive order to buy the security but worse than the hidden price from a terminal of the plurality of terminals;
diminish the market spread for the security by improving the price of both the first passive order to buy the security and the first passive order to sell the security so that both the first passive order to buy the security and the first passive order to sell the security remain at the head of respective bid and offer queues.

69. The system of claim 68, wherein the price of the first passive order to buy is increased to an amount equal to the price of the second passive order to buy.

70. The system of claim 68, wherein the price of the first passive order to buy is increased to an amount equal to the price of the second passive order to buy plus some increment.

71. The system of claim 68, wherein the second passive order to buy also specifies a hidden price.

72. The system of claim 68, wherein the price of the first passive order to sell is increased to an amount equal to the price of the second passive order to sell.

73. The system of claim 68, wherein the price of the first passive order to sell is increased to an amount equal to the price of the second passive order to sell plus an increment.

74. The system of claim 68, wherein the second passive order to sell also specifies a hidden price.

* * * * *